US009119355B2

(12) United States Patent
Malsam

(10) Patent No.: US 9,119,355 B2
(45) Date of Patent: Sep. 1, 2015

(54) IRRIGATION SYSTEM HAVING AN APPLICANT DISPERSAL ASSEMBLY

(75) Inventor: Craig S. Malsam, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 588 days.

(21) Appl. No.: 13/429,810

(22) Filed: Mar. 26, 2012

(65) Prior Publication Data

US 2012/0253530 A1 Oct. 4, 2012

Related U.S. Application Data

(60) Provisional application No. 61/468,640, filed on Mar. 29, 2011.

(51) Int. Cl.

*A01G 25/00* (2006.01)
*A01G 25/16* (2006.01)
*A01G 25/09* (2006.01)
*G05D 7/06* (2006.01)

(52) U.S. Cl.

CPC ................ *A01G 25/16* (2013.01); *A01G 25/09* (2013.01); *G05D 7/0676* (2013.01)

(58) Field of Classification Search

CPC ....... A01G 3/12; A01G 25/09; A01G 25/092; A01G 25/16; A01G 25/165
USPC ................ 239/722, 723, 726, 727, 67, 68, 69
See application file for complete search history.

(56) References Cited

U.S. PATENT DOCUMENTS 4,692,673 A * 9/1987 DeLong ........................ 318/132
4,993,634 A * 2/1991 Hach et al. ....................... 239/10
5,246,164 A 9/1993 McCann et al. ................ 239/11
5,340,288 A * 8/1994 Mikiya et al. ................. 417/417
5,785,246 A 7/1998 King et al. ....................... 239/11
5,878,953 A 3/1999 Coffman
2009/0166451 A1 * 7/2009 Parod et al. ................... 239/723
2009/0277506 A1 11/2009 Bradbury

FOREIGN PATENT DOCUMENTS

WO 2012021687 2/2012

OTHER PUBLICATIONS

B. A. King et al. "A Variable Flow Rate Sprinkler for Site-Specific Irrigation Management", *Applied Engineering in Agriculture© 2004 American Society of Agricultural Engineers* ISSN 0883-8542, vol. 20(6): 765-770.

* cited by examiner

*Primary Examiner* — Davis Hwu
(74) *Attorney, Agent, or Firm* — David H. Milligan PC LLO

(57) ABSTRACT

An applicant dispersal assembly is described that couples to an irrigation system. It is contemplated that the irrigation system may be a center pivot irrigation system, a linear move irrigation system, or the like. The applicant dispersal assembly is configured to receive an applicant and selectively adjust a flow rate of the applicant. In an implementation, the applicant dispersal assembly includes a pump assembly configured to couple to an irrigation conduit. The irrigation conduit is configured to provide an applicant to the pump assembly for dispersing over a cultivation area. The pump assembly is configured to pump the applicant and to selectively adjust a flow rate of the applicant. The applicant dispersal assembly also includes an applicant dispersal device that is coupled to the pump assembly. The applicant dispersal device is configured to disperse the applicant.

7 Claims, 6 Drawing Sheets

```
                                         ┌─ 400
                                        /

                                              ┌─ 402
┌─────────────────────────────────────────────────┐
│ DETERMINE A POSITION ASSOCIATED WITH AN APPLICANT│
│              DISPERSAL ASSEMBLY                  │
└─────────────────────────────────────────────────┘
                        │
                        ▼                     ┌─ 404
┌─────────────────────────────────────────────────┐
│  DETERMINE A DESIRED FLOW RATE ASSOCIATED WITH THE│
│                    POSITION                      │
└─────────────────────────────────────────────────┘
                        │
                        ▼                     ┌─ 406
┌─────────────────────────────────────────────────┐
│ TRANSMIT A SIGNAL REPRESENTING THE DESIRED FLOW RATE TO│
│           THE APPLICANT DISPERSAL ASSEMBLY       │
└─────────────────────────────────────────────────┘
```

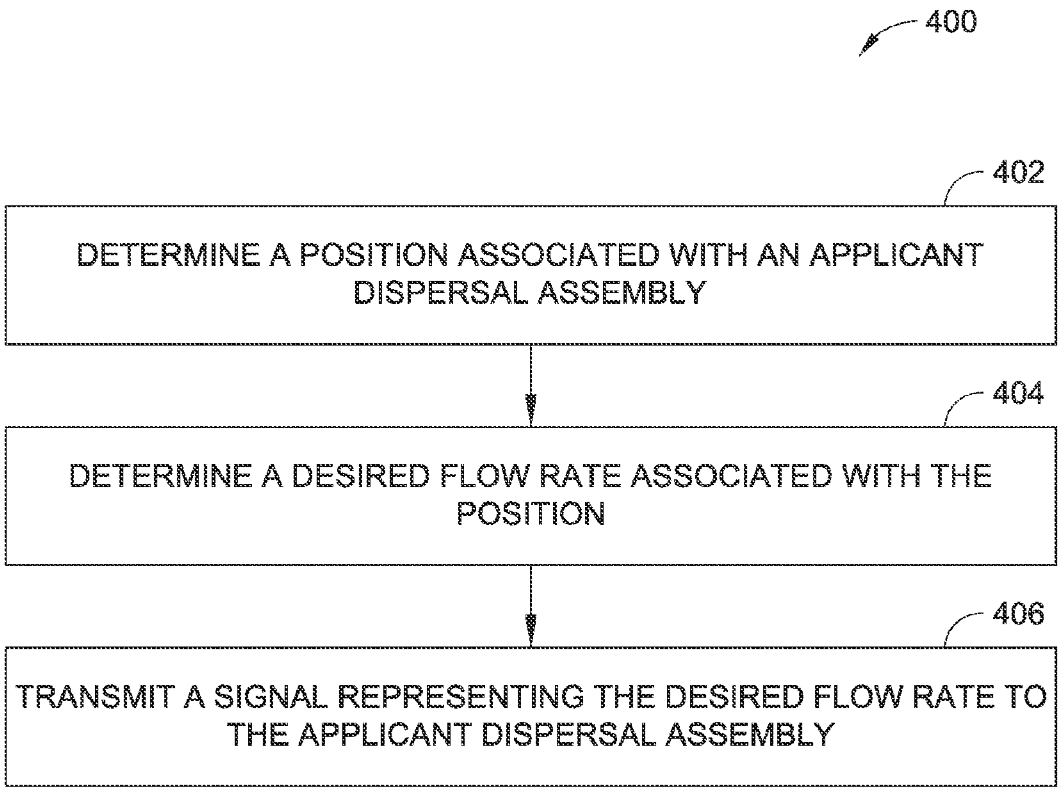

```
                                            ┌─ 500
                                           ╱

                                          ┌─ 502
┌─────────────────────────────────────────────┐
│  RECEIVE A SIGNAL REPRESENTING A POSITION   │
│  ASSOCIATED WITH AN APPLICANT DISPERSAL     │
│  ASSEMBLY                                   │
└─────────────────────────────────────────────┘
                      │
                      ▼                   ┌─ 504
┌─────────────────────────────────────────────┐
│  DETERMINE A DESIRED FLOW RATE ASSOCIATED   │
│  WITH THE POSITION                          │
└─────────────────────────────────────────────┘
                      │
                      ▼                   ┌─ 506
┌─────────────────────────────────────────────┐
│  CAUSE A PUMP ASSEMBLY OF THE APPLICANT     │
│  DISPERSAL ASSEMBLY TO ADJUST AN APPLICANT  │
│  FLOW RATE BASED UPON THE POSITION          │
└─────────────────────────────────────────────┘
```

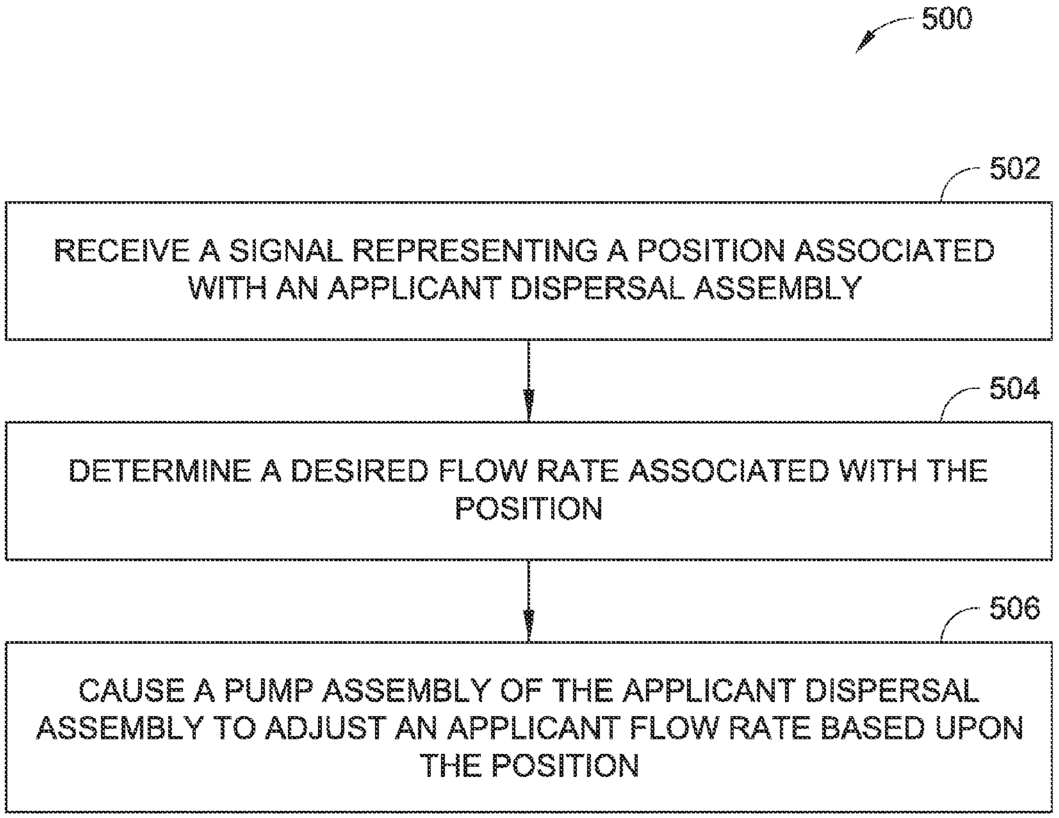

FIG. 5

IRRIGATION SYSTEM HAVING AN APPLICANT DISPERSAL ASSEMBLY

CROSS-REFERENCE TO RELATED APPLICATIONS

The present application claims the benefit under 35 U.S.C. §119(e) of U.S. Provisional Application Ser. No. 61/468,640, entitled MECHANIZED IRRIGATION SYSTEM WITH MINIATURE VFD PUMP ASSEMBLY AND METHOD OF USE, filed on Mar. 29, 2011. U.S. Provisional Application Ser. No. 61/468,640 is herein incorporated by reference in their entireties.

BACKGROUND

Modern day agriculture has become increasingly efficient in the past century and this trend must continue in order to produce a sufficient food supply for the increasing world population. A notable advancement in agricultural production was the introduction of mechanized irrigation systems, such as the center pivot and linear move irrigators. These irrigation systems make it possible to irrigate entire fields thereby reducing a crop yield's vulnerability to extreme weather conditions. The ability to monitor and to control the amount of water and/or nutrients applied to an agricultural field has increased the amount of farmable acres in the world and increases the likelihood of a profitable crop yield.

SUMMARY

An applicant dispersal assembly is described that couples to an irrigation system. It is contemplated that the irrigation system may be a center pivot irrigation system, a linear move irrigation system, or the like. The applicant dispersal assembly is configured to receive an applicant and selectively adjust a flow rate of the applicant. In an implementation, the applicant dispersal assembly includes a pump assembly configured to couple to an irrigation conduit (e.g., an irrigation pipe). The irrigation conduit is configured to provide an applicant to the pump assembly for dispersing over a cultivation area (e.g., a field). The pump assembly is configured to pump the applicant and to selectively adjust a flow rate of the applicant. The applicant dispersal assembly also includes an applicant dispersal device that is coupled to the pump assembly. The applicant dispersal device is configured to disperse the applicant.

DRAWINGS

The detailed description is described with reference to the accompanying figures. The use of the same reference numbers in different instances in the description and the figures may indicate similar or identical items.

FIG. 4 is a flow diagram illustrating an example method for selectively adjusting a flow rate of an applicant through an applicant dispersal assembly, such as the applicant dispersal assembly shown in FIG. 2.

FIG. 5 is a flow diagram illustrating another example method for selectively adjusting a flow rate of an applicant through an applicant dispersal assembly, such as the applicant dispersal assembly shown in FIG. 2.

DETAILED DESCRIPTION

Overview

Many irrigation systems apply water to fields having up to six hundred and forty (640) acres. This field size may be of varying field, elevation, and soil conditions that require different amounts of water and/or nutrients to be applied at individual locations within the field. However, mechanized irrigations systems currently in use only allow for water to be applied at a constant flow rate or a constant application rate throughout the entire length of the system. The constant application rate requires an operator to set a flow rate corresponding to the most predominate field, soil, elevation, or crop condition along the entire length system. This limitation often results in overwatering portions of the field while under watering other portions of the field, which reduces the efficiency of the application of water and/or nutrients as well as resulting in potential damage to the crops.

Accordingly, an irrigation system that includes an applicant dispersal assembly is described. It is contemplated that the irrigation system may be a center pivot irrigation system, a linear move irrigation system, or the like. The applicant dispersal assembly is configured to receive an applicant and selectively adjust a flow rate of the applicant. In an implementation, the applicant dispersal assembly includes a pump assembly configured to couple to an irrigation conduit (e.g., an irrigation pipe). The irrigation conduit is configured to provide an applicant to the pump assembly for dispersing over a cultivation area (e.g., a field). The pump assembly is configured to pump the applicant and to selectively adjust a flow rate of the applicant. In an implementation, the pump assembly is a variable-frequency drive (VFD) pump assembly. The applicant dispersal assembly also includes an applicant dispersal device that is coupled to the pump assembly. The applicant dispersal device is configured to disperse the applicant. In a specific implementation, the applicant dispersal device is a sprinkler assembly with a sprinkler head.

The irrigation system includes a control device (e.g., control panel) in electronic communication with each pump assembly. For example, the control device may utilize a computer executable program (e.g., a water application map), that when executed, is configured to cause the pump to vary the flow of applicant (or water). For instance, the computer executable program may include data and/or parameters representing the desired flow rate for specific areas of a cultivation area. In an implementation, the control device is configured to transmit a signal via a communication module to the various pump assemblies coupled to the irrigation system.

Example Implementations

Figure 1A:
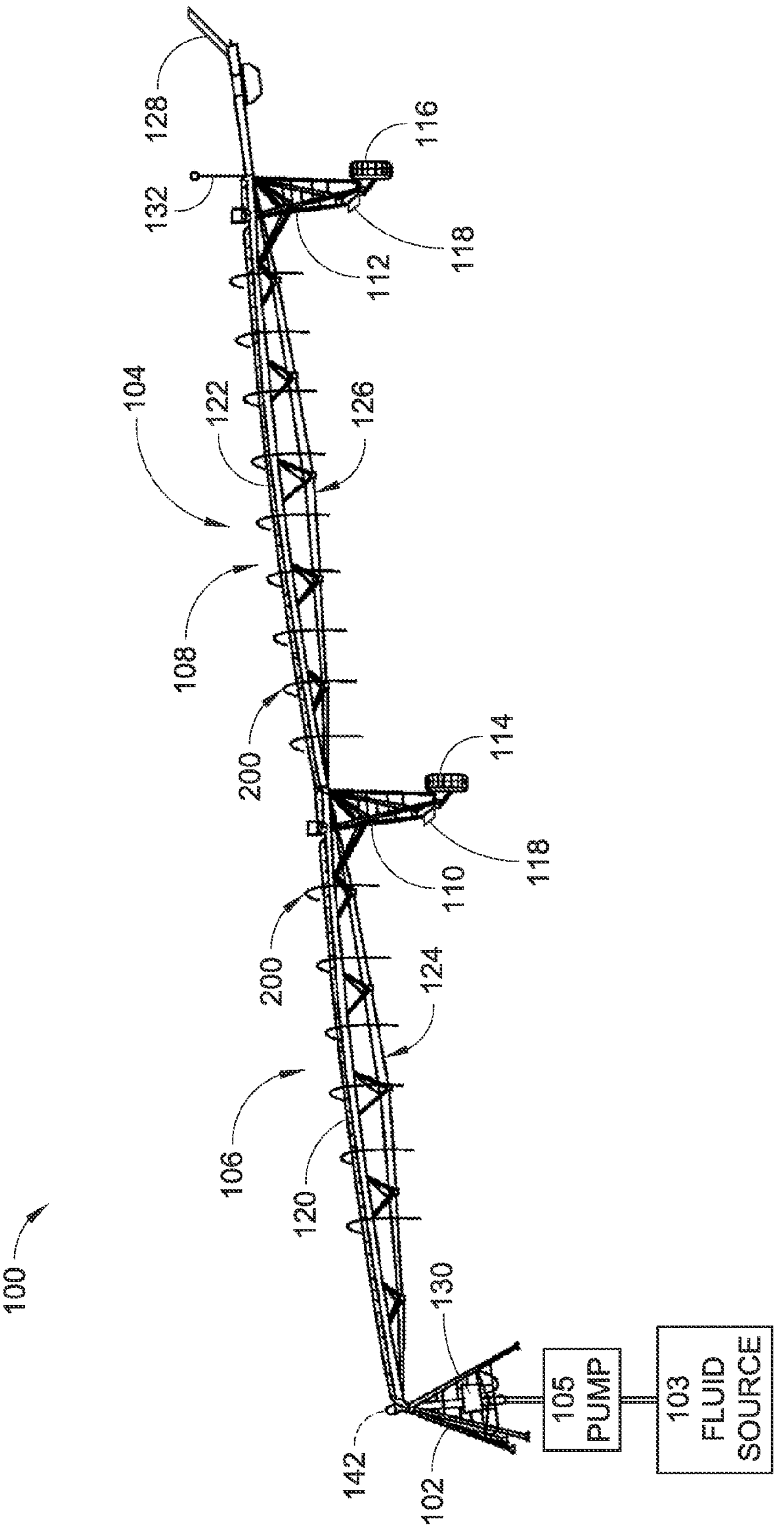
FIG. 1A is an isometric perspective view of an irrigation system in accordance with an example implementation of the present disclosure, wherein the irrigation system includes a applicant dispersal assembly.

FIGS. 1A through 3 illustrate a self-propelled (e.g., mechanized) irrigation system 100 in accordance with example implementations of the present disclosure. Examples of self-propelled irrigation systems include a center pivot irrigation system, a linear move irrigation system, or the like. FIG. 1A illustrates an embodiment of the present disclosure where the irrigation system 100 is a center pivot irrigation system. However, it is contemplated that the present disclosure may be implemented in other self-propelled irrigation systems (e.g., linear move irrigation systems). As shown, the system 100 includes a center pivot structure 102, a main section assembly 104 (irrigation section assembly) coupled (e.g., connected) to the center pivot structure 102. The center pivot structure 102 has access to a well, a water repository (e.g., water tank), or other fluid source 103, to furnish water to the irrigation system 100. For instance, the well may be located under the center pivot structure 102. In another instance, the well may be in close proximity to the cultivation area (e.g., field). The fluid source may be coupled to a repository or other source of agricultural products to inject fertilizers, pesticides, and/or other chemicals into the fluids to create an applicant for application during irrigation. Thus, the applicant may be water, fertilizer, herbicide, pesticide, combinations thereof, or the like. The irrigation system 100 also includes a main fluid displacement device 105 (e.g., a main pump assembly) configured to furnish applicant throughout the irrigation system 100. For example, the main fluid displacement device 105 may assist in displacing fluid from the fluid source (e.g., well, water repository, etc.) to the conduit portions of the irrigation system, which are described herein. The center pivot structure 102 can be fixed or can be towable such that an operator can move the irrigation system 100 from one field to another. In an implementation, the center pivot structure 102 may comprise a frame assembly (e.g., galvanized steel frame assembly, and so forth).

The main section assembly 104 includes a number of interconnected spans 106, 108 (e.g., irrigation spans) supported by one or more tower structures 110 and an end tower structure 112. The tower structures 110 may be any tower configuration known in the art to adequately support the conduits (e.g., water pipe sections) described herein. It is understood that the section assembly 104 may include any number of spans and tower structures.

The tower structures 110, 112 each include wheels 114, 116, respectively, to assist in traversing (e.g., pivoting) the irrigation system 100 about a cultivation area (e.g., field). While only wheel 114, 116 is shown mounted to the respective tower structure 110, 112, it is understood that each tower structure 110, 112 may include two wheels. In an implementation, the wheels 114, 116 may be driven by a suitable drive unit 118 (e.g., drive motor), or the like, to assist in traversing the system 100 about the specified area. For example, each tower structure 110 may include a drive unit 118 to propel the respective tower structure 110, 112 (and the irrigation system 100) through the cultivation area. In an implementation, each drive unit 118 may be controlled by a stop system so that the drive unit 118 can be slowed or completely shut down in the event of an adverse circumstance.

As shown in FIG. 1A, each span 106, 108 includes conduits 120, 122 (e.g., pipes) that are configured to carry (e.g., transport, provide, and so forth) liquid (e.g., applicant) along the length of the system 100 to one or more variable applicant dispersal assemblies 200 (see FIG. 2) that are configured to irrigate the cultivation area. Each conduit 120, 122 may be coupled to one another to allow fluid communication between each conduit. In an implementation, the conduits 120, 122 may be supported by truss-type framework structures 124, 126. Thus, the main fluid displacement device 105 may be configured to displace applicant through the conduits 120, 122. As shown in FIG. 1A, the section assembly 104 includes an end gun 128 mounted to the end tower structure 112. In an implementation, the end gun 128 is a suitable pressure sprayer configured to be activated at the corners of a field or other designated areas to increase the amount of land that can be irrigated.

Figure 1B:
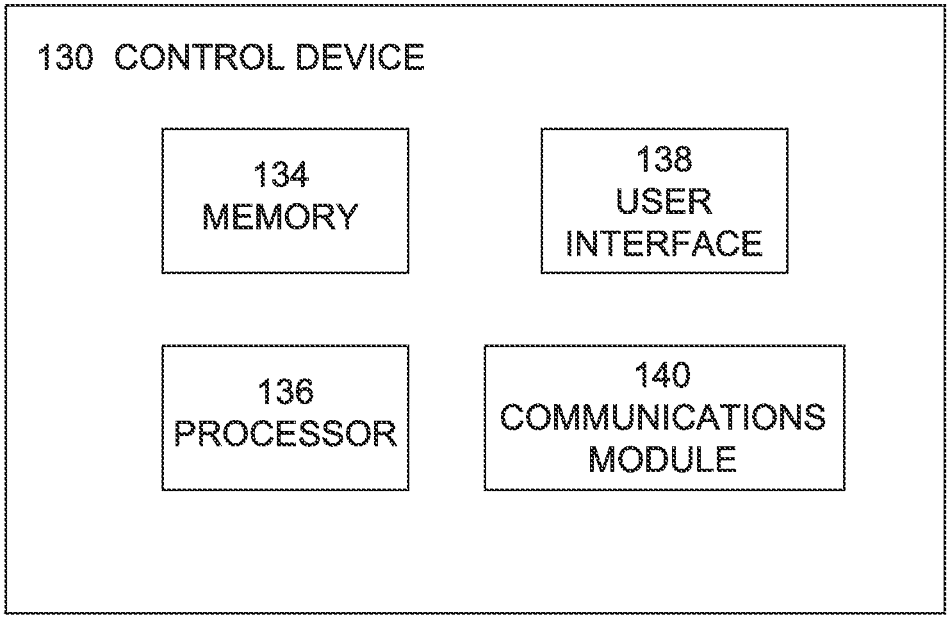
FIG. 1B is a block diagram illustrating a control device of the irrigation system shown in FIG. 1A in accordance with an example implementation of the present disclosure.

As shown in FIGS. 1A and 1B, the irrigation system 100 includes a control device 130 (e.g., control panel) that is in electronic communication with one or more components of the system 100. For example, the control device 130 may be in electronic communication with one or more tower boxes mounted at one or more tower structures 110, 112 and a position sensor 132 utilized to determine an approximate position of the irrigation system (e.g., determining the approximate position of the end tower structure 112 within the cultivation area with respect to the center pivot structure 102). For example, the position sensor 132 may be a GPS sensor, or the like.

In an implementation, the control device 130 is mounted to the central pivot structure 102, a control cart, or a tower structure 110, 112. The control device 130 is generally located on the structural element of the irrigation system 100 where the applicant/water is introduced into the irrigation system; however, other configurations known in the art are within the scope of the present disclosure.

The control device 130 is configured to monitor operating conditions and configured to control various functions of the irrigation system 100. In certain implementations, the control device 130 actively monitors the irrigation system's 100 function and performance including, but not limited to: a position of one or more conduit sections 120, 122 or tower structures 110, 112 (by way of the position sensor 132), whether the irrigation system 100 is powered on or off, a voltage parameter associated with the irrigation system 100, a motor speed parameter associated with the irrigation system 100, an approximate ground speed parameter associated with the irrigation system 100, a direction parameter associated with the irrigation system 100, a diagnostic parameter associated with the irrigation system 100, whether the applicant is being supplied to the irrigation system 100 (e.g., whether the main fluid displacement device 105 is operational), whether the Stop in Slot (SIS) is powered on or off, an applicant pressure associated with the irrigation system 100, a time parameter, a date parameter, a field position parameter of the irrigation system components, end-gun status, and whether the programs (e.g., software programs, etc.) are running properly. The control device 130 also controls the irrigation system's 100 functions and settings, including, but not limited to: start and stop, selectively powering the main fluid displacement device 105, an applicant application depth parameter, a direction of travel associated with the irrigation system 100, selectively powering the SIS, automatically reversing or stopping the irrigation system 100, automatically restarting the irrigation system 100, providing an operator auxiliary control to the system 100, writing and editing irrigation programs (e.g., irrigation software programs), and controlling sector and sequential programs (e.g., software programs). In another implementation, the control device 130 may cause an alert to be issued to the operator if there are any errors in the operation of the irrigation system 100 or if any of the functions or conditions monitored by the control device 130 have been compromised (e.g., ceased operation or are outside an acceptable range).

The control device 130 may be housed in a weather-proof box and includes at least a memory 134 to store one or more software programs (e.g., software modules), a processor 136 electronically coupled to the memory 134, a user-interface

138, and a communications module 140 configured to transmit one or more signals to instruct a pump assembly (described herein) to pump at the desired flow rate (see FIG. 1B). Thus, the processor 136 may be configured to cause the communication module 140 to transmit one or more signals to instruct the pump assembly to pump at the desired flow rate. The communication module 140 is also configured to facilitate communication over a communication network. The communication module 140 may be representative of a variety of communication components and functionality, including, but not limited to: one or more antennas, a transmitter and/or receiver, a transceiver, or the like. The control device 130 is generally operated using proprietary software and may be connected to a communication network (e.g., a wireless network, a wired network, combinations thereof, or the like) that allows a user to remotely input operational parameters, remotely view the operational status of the irrigation system 100, and receive remote alerts if the irrigation system 100 is not operating correctly. The control device 130 may be in electronic communication with the various sensors, switches, motors, valves, pumps, and monitors that control the operation of the irrigation system 100, which allows the control device 130 to monitor the operating parameters/conditions of the irrigation system 100. It is understood that many implementations of the control device 130 are known in the art and all such implementations of the control device 130 are within the scope of the present disclosure. The user interface 138 is representative of functionality to provide an operator an interface with the control device 130 (e.g., a graphical user interface in communication with input devices, etc.).

Figure 2:
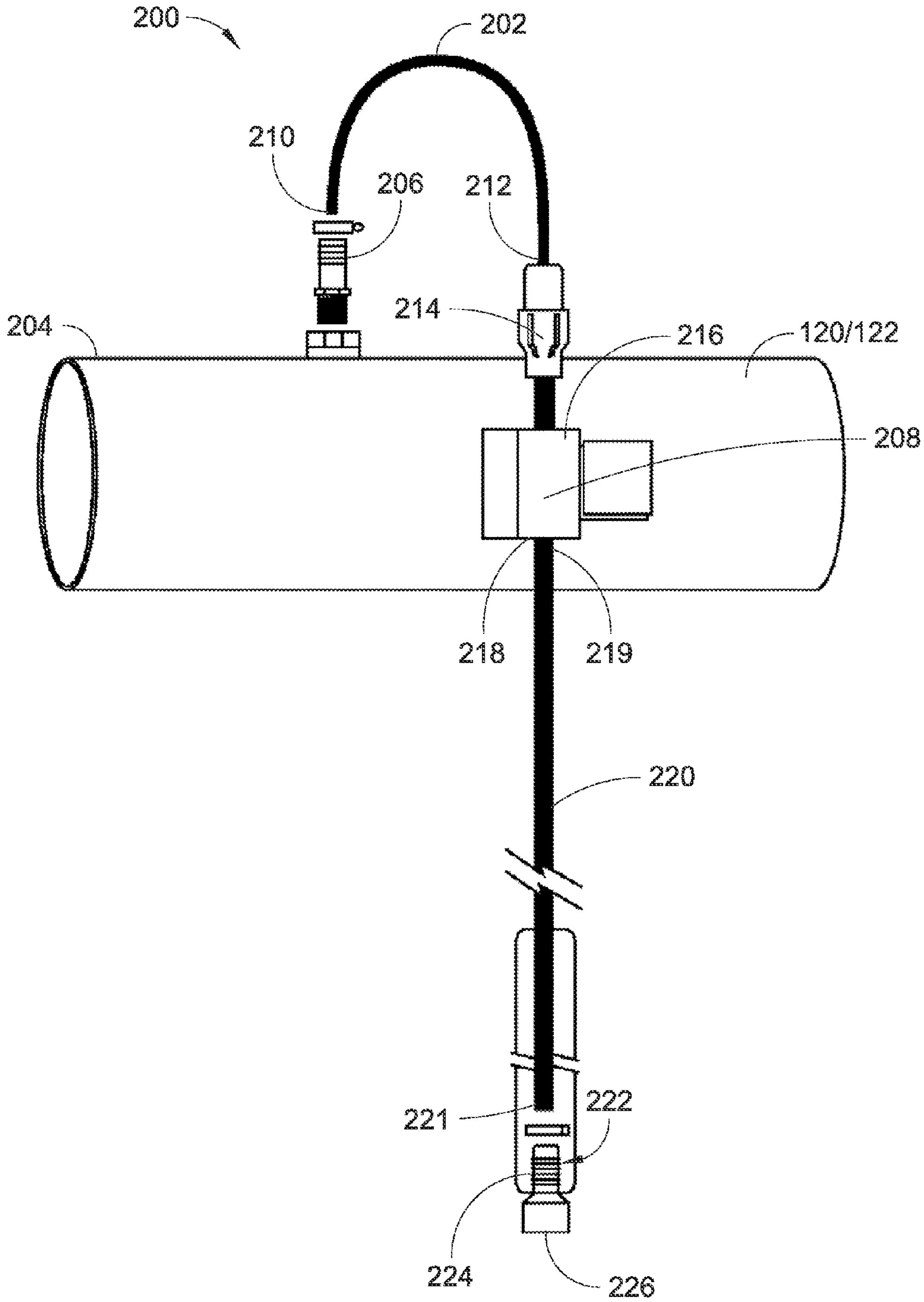
FIG. 2 is a partial side elevation view of an applicant dispersal assembly in accordance with an implementation of the present disclosure, wherein the applicant dispersal assembly includes an applicant supply conduit, a pump assembly, and applicant dispersal device.

As shown in FIG. 2, the irrigation system 100 includes an applicant dispersal assembly 200. Each applicant dispersal assembly 200 includes an applicant supply conduit, such as a U-pipe 202, coupled (e.g., removably coupled) to conduits 120, 122. In an implementation, the U-pipe 202 is coupled to an upper surface 204 (surface opposite ground) of the conduits 120, 122 via a connector 206. The U-pipe 202 is also coupled to a secondary fluid displacement device, such as a pump assembly. In an implementation, the pump assembly is a variable frequency drive (VFD) pump assembly 208. For example, the first end 210 of the U-pipe 202 is coupled (e.g., via male/female thread connectors, etc.) to the connector 206, and the second end 212 of the U-pipe 202 is coupled to the VFD pump assembly 208. As shown in FIG. 2, the second end 212 of the U-pipe 202 may be coupled to the VFD pump assembly 208 by way of a pressure regulator 214 (e.g., the pressure regulator 214 may be disposed between the U-pipe 202 and the pump assembly 208), which is configured to prevent the flow of applicant through the regulator 214 at (or above) a pre-determined pressure. In this implementation, the first end 216 of the VFD pump assembly 208 is coupled (operably coupled) to the pressure regulator 214, and the second end 218 of the pump assembly 208 is coupled to a first end 219 of a tube/pipe, such as a drop hose 220. However, it is contemplated that the applicant dispersal assembly 200 may not include a pressure regulator in some implementations. Instead, the first end 216 of the VFD pump assembly 208 may be coupled to the second end 212 of the U-pipe 202. The second end 221 of the drop hose 220 is coupled (operably coupled) to an applicant dispersal device 222 at the other end (e.g., end opposite the pump assembly 208 connection). It is contemplated that the length of the drop hose 220 may vary according to the requirements of the irrigation system 100. For example, the length of the drop hose 220 generally corresponds to the type of crop being grown within the cultivation area. In another implementation, the drop hose 220 may also be manufactured from rigid or flexible materials.

In implementations, the applicant dispersal device 222 is a sprinkler 224 (e.g., a sprinkler assembly) with a sprinkler head 226. There are multiple known sprinklers 224 and sprinkler heads 226, spacing and configurations known in the art. Sprinklers 224 and sprinkler heads 226 can be made from any material known in the art, including but not limited to: PVC, polyethylene, various other plastic formulations, aluminum, rubber, steel, and other metals. Factors considered in selecting a sprinkler head and sprinkler assembly include, but are not limited to: the crop being grown, the type of applicant (water, fertilizer, herbicide or pesticide), the type of soil, the weather, and the growing conditions. The VFD pump assembly 208 is configured to adjust a flow rate of the applicant supplied to the applicant dispersal device 222. As a result, the applicant dispersal device 222 disperses the applicant corresponding to a flow rate over the cultivation area (e.g., field). For example, the amount of applicant and the drop pattern of the applicant dispersed through the sprinkler head 226 corresponds to the flow rate. In an implementation, the flow rate of the applicant can be variably (dynamically) adjusted by the VFD pump assembly 208.

In an implementation, the VFD pump assembly 208 may be directly connected to the connector 206. In another implementation, the VFD pump assembly 208 is disposed between (coupled to) the second end 221 of the drop hose 220 and the applicant dispersal device 222 for dynamically (e.g., variably) controlling/adjusting the flow of applicant through the applicant dispersal device 222. However, it is contemplated that the VFD pump assembly 208 may be located at any position along the length of the applicant dispersal assembly 200.

Figure 3:
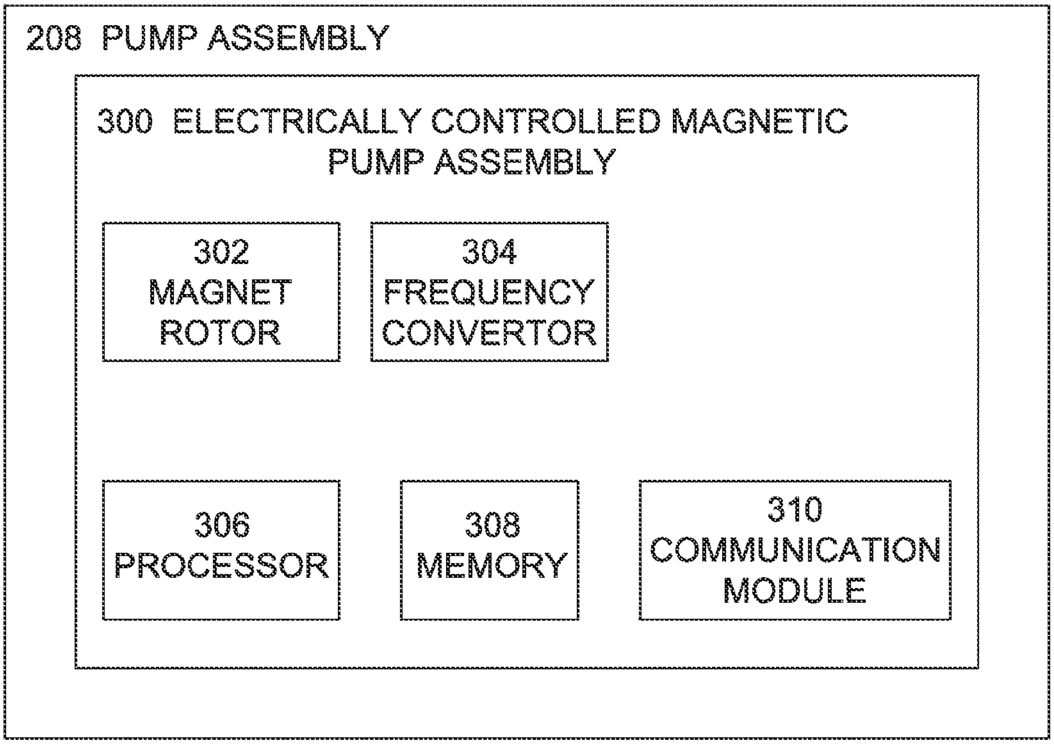
FIG. 3 is a block diagram illustrating a pump assembly in accordance with an example implementation of the present disclosure, wherein the pump assembly is an electrically controlled magnetic (ECM) pump assembly.

The VFD pump assembly 208 is configured to selectively/variably adjust the volumetric flow rate of an applicant supplied to the applicant dispersal device 222 (e.g., amount of applicant furnished to the sprinkler 224 for dispersing through the sprinkler head 226). Thus, the pump assembly 208 is configured to pump the applicant at the selected flow rate. In a specific implementation, as shown in FIG. 3, the VFD pump assembly 208 is an electrically controlled magnetic (ECM) pump assembly 300 including a magnet rotor 302 and frequency convertor 304. For example, the VFD pump assembly 208 may be similar to a GRUNDFOS UPM2 pump assembly, or the like. The VFD pump assembly 208 is configured to dynamically control the flow rate of the applicant and the application rate, which may range from about zero cubic meters per hour (0 $m^3$/h) to about three and a half cubic meters per hour (3.5 $m^3$/h). Electricity supply cables are generally installed along the mechanized irrigation equipment of the system 100 to provide power to the VFD pump assembly 208. In an implementation, the VFD pump assembly 208 does not exceed plus thirty volts alternating current (+30 VAC) or plus thirty volts direct current (+30 VDC).

The VFD pump assembly 208 may also include control logic configured to control the VFD pump assembly 208. In an implementation, the control logic is configured to control the VFD pump assembly 208 (and the volumetric flow rate of an applicant dispersed) by controlling the speed of the pump assembly 208. For example, as shown in FIG. 3, the pump assembly 300 includes control logic, such as a processor 306 in electronic communication with a memory 308, and a communication module 310. The processor 306 is configured to provide processing functionality to the VFD pump assembly 300. Thus, the processor 306 may execute one or more software programs and/or instructions described herein. The memory 308 is an example of tangible computer-readable media that provides storage functionality to store various data associated with the operation of the VFD pump assembly 208, such as software programs/modules and code segments mentioned herein, or other data to instruct the processor 306 to perform the steps described herein. The communication module 310 is configured to communicate with other components (e.g., communication module 140) over a communication network (e.g., a wireless network, a wired network, etc.). The communication module 310 may be representative of a variety of communication components and functionality, including, but not limited to: one or more antennas, a transmitter and/or receiver, a transceiver, or the like.

The VFD pump assembly 208 may be in electronic communication with the control device 130, or other type of controller known in the art. For example, the controller may be a programmable logic controller. As described above, the electronic communication may be achieved through a wired or a wireless connection, combinations thereof, or the like. For example, in an implementation, the VFD pump assembly 208 includes a receiver (e.g., a radio receiver, or the like) to receive signals transmitted via a transmitter associated with the control device 130 or the controller, and vice versa. The control device 130, or the controller, is configured to transmit a signal representing various parameters corresponding to determining or adjusting the flow rate of the applicant to the VFD pump assembly 208. In an implementation, the control device 130 communicates the current position of the irrigation system 100 in the field. In another implementation, the control device 130 directly communicates the desired flow rate to one or more VFD pump assemblies 208. This direct communication may be made at predetermined time intervals.

An implementation of the present disclosure may include a VFD pump assembly 208 coupled to every conduit (e.g., U-pipe with drop hose and sprinkler assembly) along the irrigation system 100 (excluding the end gun 128). In another implementation, an operator could include the VFD pump assembly 208 only on specific conduits in combination with other conduits having no variable flow rate capability.

In use, an operator first generates a water application map using a computing device, such as a desktop computer, a laptop computer, a tablet computer, or the like, utilizing a water application mapping program. In an implementation, the water application mapping program (e.g., module) may be stored in the memory 134 of the control device 130 and executable by the processor 136. In another implementation, the water application mapping program may be stored in memory 308 and executable by the processor 306 of the EMC pump assembly 300. When executed by the processor 136 (or processor 306), a water application map generally furnishes data/parameters indicating the desired water application in a particular cultivation area (e.g., field). In an implementation, the desired water application map may be pre-programmed in a lookup table configuration, or the like. The VFD pump assembly 208 may be pre-programmed with information including, but not limited to: the location of the VFD pump assembly 208 with respect to the irrigation system 100 (e.g., which U-pipe 202 the pump assembly 208 is disposed on with respect to the center pivot structure 102, etc.) and the water application map. In an implementation, the VFD pump assembly 208 is pre-programmed with a water application map unique to pump assembly 208. For each VFD pump assembly 208, the water application map may include the pre-determined flow rate corresponding to a rotational position of the irrigation system 100 with respect to the center pivot structure 102. In other implementations, the referenced position may be based on a linear position of the irrigation system 100 or geographic coordinates representing a location of the irrigation system 100 within the cultivation area. An example of a water application map with respect to the mechanized irrigation system's 100 rotational position in the field is presented in Table 1:

TABLE 1

| Machine Position (Degrees) | Application Rate (inches) |
|---|---|
| 0.0 | 0.0 |
| 0.1 | 1.0 |
| 0.2 | 0.9 |
| 0.3 | 0.9 |
| 0.4 | 1.2 |
| . | . |
| . | . |
| . | . |
| 359.9 | 0.0 |

Thus, the applicant's flow may be dynamically adjusted according to the rotational position of the irrigation system 100. For example, the processor 306 may be configured to adjust the speed of the VFD pump assembly 208 based upon the position of the irrigation system 100 so that the applicant dispersal rate from the sprinkler head 226 approximately matches the application rate stored within the water application map. It is contemplated that the water application map may include a distinct application rate for each VFD pump assembly 208. For instance, each position in the water application map may include a distinct application rate for each VFD pump assembly 208. Thus, at each position, the application rate may differ for one or more VFD pump assemblies 208.

Once the irrigation system 100 commences an irrigation program, the position of the irrigation system 100 can be monitored. The position of the irrigation system 100 can be determined using any method known in the art including, but not limited to: measuring the rotation about the center pivot structure 102 using a rotational encoder (e.g., rotational position sensor 142), measuring the coordinates of the irrigation system utilizing GPS techniques (e.g., utilizing the position sensor 132) and then calculating the rotational translation, or any other suitable positioning techniques. In an implementation, the control device 130 receives the signals representing data corresponding to the irrigation system's 100 position from the position sensor 132 and then calculates the mechanized irrigation system's position using suitable positioning measurement techniques. Next, the control device 130 transmits a signal representing data corresponding to the position of the irrigation system 100 to each individual miniature VFD pump assembly 208. The field position of the irrigation system 100 may be sent to the VFD pump assembly 208 at pre-determined time intervals. In another implementation, a GPS receiver is mounted on the irrigation system 100 near a controller that is configured to receive the GPS position. The controller is configured to convert the GPS position into a machine position or an angle of the system 100 with respect to the center pivot structure 102 according to known methods. The controller is configured to transmit a signal representing the machine position (or the angle) to the VFD pump assembly 208. This implementation can be used if the mechanized irrigation system does not include the control panel.

The VFD pump assembly 208 is then configured to adjust the flow rate of the applicant to correspond to the position of the irrigation system 100 in the field. For example, the position of the system 100 is transmitted to the VFD pump assembly 208 and the processor 306 compares the approximate position of the irrigation system 100 to the position stored within the lookup table to determine the corresponding applicant application rate (see Table 1). The processor 306 then causes the VFD pump assembly 208 to adjust the speed of the pump assembly to provide the pre-determined flow rate for that field position. However, it is contemplated that in another implementation that the control device 130 may also store the water application map within the processor 136. Thus, the control device 130 may be configured to determine the flow rate by comparing the field position of the irrigation system 100 with the machine position stored in the water application map. A signal representing the desired flow rate (e.g., the application rate stored in the water application map corresponding to the machine position) is then transmitted by the control device 130 to the respective VFD pump assembly 208. Based upon the signal, the processor 306 causes the speed of the VFD pump assembly 208 so that the VFD pump assembly 208 pumps at about the desired flow rate so the amount of applicant dispersed is approximately equal to the application rate stored in the water application map.

The utilization of secondary fluid displacement devices (VFD pump assemblies 208) allows the main fluid displacement device 105 to furnish the applicant to the irrigation system 100 (e.g., furnish applicant to the conduits 120, 122) at a lower pressure, which may decrease the overall power consumption associated with the irrigation system 100. For example, the main fluid displacement device 105 may furnish applicant at pressures as low as about five pounds per square inch (5 psi) as compared to irrigation systems having no secondary fluid displacement devices, which displaces applicant at a pressure ranging from about thirty pounds per square inch (30 psi) to about sixty pounds per square inch (60 psi). Thus, the main fluid displacement device 105 may furnish applicant at pressures of about five pounds per square inch (5 psi) to about ten pounds per square inch (10 psi). However, this range is provided for example purposes only, and is not meant to be restrictive of the present disclosure. Thus, a main fluid displacement device 105 may furnish applicant at other pressures.

Additionally, each VFD pump assembly 208 may be independently operable with regards to the other VFD pump assemblies 208. For example, a first VFD pump assembly 208 may furnish an applicant to the respective applicant dispersal device 222 at a first flow rate while a second VFD pump assembly 208 furnishes the applicant to the respective applicant dispersal device 222 at a second flow rate (where the first flow rate is different than the second flow rate). It is also contemplated that the spray pattern at the sprinkler head 226 may not be modified due to the VFD pump assembly 208 (as compared to sprinklers that are coupled to variable controlled valves).

Example Methods

FIG. 4 is a flow diagram illustrating an example method 400 for selectively adjusting a flow rate of an applicant through an applicant dispersal assembly 200 of a self-propelled irrigation system 100 in accordance with example implementations of the present disclosure. As shown in FIG. 4, a position associated with an applicant dispersal assembly is determined (Block 402). In an implementation, the rotational (or angular) position of the irrigation system 100 is determined (rotational position of the spans 106 with respect to the center pivot structure 102) utilizing the position sensor 132. For example, the position sensor 132 is mounted proximate to an end tower structure 112. At predetermined intervals, the position sensor 132 is configured to transmit signals representing the approximate position of the end tower structure 112. The control device 130 may utilize suitable positioning determining techniques to determine the angular or rotational position of the span 106 with respect to the center pivot structure 102. In another implementation, the rotational position of the irrigation system 100 (rotational position of the span 106 with respect to the center pivot structure 102) may be determined by receiving a signal representing a rotational or angular position of the irrigation system 100 from a rotational position sensor 142 mounted at the center pivot structure 102.

A desired flow rate (e.g., dispersal rate) associated with the position is determined (Block 404). In an implementation, the control device 130 compares the position determined in Block 402 with the positions stored in the water application map to approximately match the determined position with the water application map position to determine the corresponding application rate stored within the water application map. As described above, each individual applicant dispersal assembly 200 (e.g., each VFD pump assembly 208) may have a distinct application rate associated with it (an applicant rate stored within the water application map. However, it is understood that the application rate may be uniform for each applicant dispersal assembly 200. In an implementation, the control device 130 may utilize a lookup table to compare the determined position to the position within the lookup table to determine the corresponding stored application rate for the applicant dispersal assembly 200. Based upon the application rate, the control device 130 is configured to generate a signal representing the desired applicant flow rate, which is transmitted to the respective VFD pump assembly 208.

As shown in FIG. 4, the control device transmits a signal representing the desired applicant flow rate to the applicant dispersal assembly for instructing the pump assembly to pump at the desired flow rate (Block 406). In an implementation, the control device 130 transmits the desired flow rate to the VFD pump assembly 208 to instruct the pump assembly 208 to pump at the desired flow rate. As described above, the pump assembly 208 is configured to pump the applicant and to selectively adjust the flow rate of the applicant. The applicant is then furnished to an applicant dispersal device 222 (e.g., sprinkler 224) for dispersal over the cultivation area. In an implementation, each pump assembly 208 may have a flow rate that corresponds to the position of the irrigation system 100.

FIG. 5 is another flow diagram illustrating an example method 500 for selectively adjusting a flow rate of an applicant through an applicant dispersal assembly 200 of a self-propelled irrigation system 100 in accordance with another example implementation of the present disclosure. As shown in FIG. 5, a signal representing a position associated with an applicant dispersal assembly is received (Block 502) at the applicant dispersal assembly. In an implementation, as described above, the rotational (or angular) position of the irrigation system 100 may determined (rotational position of the spans 106 with respect to the center pivot structure 102) utilizing the position sensor 132, which is mounted proximate to an end tower structure 112. At predetermined intervals, the position sensor 132 is configured to transmit signals representing the approximate position of the end tower structure 112. The control device 130 may utilize suitable positioning determining techniques to determine the angular or rotational position of the span 106 with respect to the center pivot structure 102. In another implementation, the rotational position of the irrigation system 100 (rotational position of the span 106 with respect to the center pivot structure 102) may be determined by receiving a signal representing a rotational or angular position of the irrigation system 100 from a rotational position sensor 142 mounted at the center pivot structure 102. In other implementations, the control device 130 may be mounted at the end tower structure 112. In this implementation, the control device 130 may be configured to determine the rotational position of the span 106 with respect to the center pivot structure 102 (e.g., the control device 130 functions as a GPS sensor). While rotational positions of the irrigation system 100 are described above, it is contemplated that the position of the irrigation system may be determined in other suitable positioning techniques. For example, a geographic position of the irrigation system may be utilized to determine the position of the irrigation system (e.g., using GPS techniques to determine a geographic location of the irrigation system).

A desired flow rate (e.g., dispersal rate) associated with the position is determined (Block 504). As described above, the water application mapping module may be stored in memory 308 and executable the processor 306. In an implementation, the processor 306 compares the position determined in Block 502 with the positions stored in the water application map to approximately match the determined position with the water application map position to determine the corresponding application rate stored within the water application map. In an implementation, the processor 306 utilizes a lookup table to compare the geographic position to the position stored within the lookup table to determine the corresponding stored application rate for the applicant dispersal assembly 200.

The processor causes the pump assembly to adjust an applicant flow rate (Block 506) based upon the application rate stored in the water application map (e.g., processor causes the pump assembly to pump at a desired flow rate). Based upon the determined application rate in the lookup table, the processor 306 causes VFD pump assembly 208 to adjust the speed of the VFD pump assembly 208 based upon the position of the irrigation system 100 and/or the position of the respective applicant dispersal assembly 200. The applicant is then furnished to an applicant dispersal device 222 (e.g., sprinkler 224) for dispersal over the cultivation area at about the application rate.

As described above, the irrigation system 100 may be coupled or include a main fluid displacement device 105 configured to displace applicant from the fluid source to the conduits 120, 122 to furnish to the applicant dispersal assembly 200 (and the end gun 128). The VFD pump assemblies 208 are configured to function as secondary fluid displacement devices. Thus, the main fluid displacement device 105 may furnish the applicant to the irrigation system 100 at lower pressures as compared to irrigation systems not having the VFD pump assemblies 208. For example, the main fluid displacement device 105 may furnish applicant at pressures as low as about five pounds per square inch (5 psi) as compared to irrigation systems having no secondary fluid displacement devices, which displaces applicant at a pressure ranging from about thirty pounds per square inch (30 psi) to about sixty pounds per square inch (60 psi). Thus, the main fluid displacement device 105 may furnish applicant at pressures of about five pounds per square inch (5 psi) to about ten pounds per square inch (10 psi).

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An applicant dispersal assembly for irrigating a chosen field, the assembly comprising:

a main water conduit;

a plurality of drop hoses extending from the water conduit, wherein the plurality of drop hoses are comprised of a plurality of sprinkler heads connected to the ends of the plurality of drop hoses;

wherein each drop hose is connected to a pump assembly, wherein each pump assembly is positioned between each sprinkler head and the supply conduit;

wherein the pump assembly comprises a transceiver element which is configured to receive instructions regarding the applicant dispersal rate for the pump assembly;

a control element, wherein the control element is configured to monitor the operating conditions of the dispersal assembly; wherein the operating conditions comprise the ground speed of the assembly, the field position of the assembly and an applicant depth parameter;

wherein the control element is further configured to receive and store a water application map for the chosen field to be irrigated; wherein, the water application map is generated at a remote location and received at the control element via a wireless transmission; further wherein the control device compares the determined field position of the assembly with the data from the water application map; and further wherein the control element is further configured to dynamically adjust the disbursement rate of each drop hose based on data from the water application map and at least in part on the ground speed of the assembly, the field position of the assembly and an applicant depth parameter.

2. The applicant dispersal assembly as recited in claim 1, wherein the pump assembly comprises a variably-frequency pump assembly.

3. The applicant dispersal assembly as recited in claim 2, wherein the variable-frequency pump assembly comprises an electrically controlled magnetic pump that includes a magnet rotor and a frequency convertor.

4. The applicant dispersal assembly as recited in claim 1, wherein the pump assembly is configured to selectively adjust a flow rate of the applicant based upon a position associated with the pump assembly.

5. The applicant dispersal assembly as recited in claim 1, wherein the flow rate of the applicant is based upon a predetermined flow rate corresponding to a rotational position associated with the pump assembly.

6. The applicant dispersal assembly as recited in claim 1, wherein the pump assembly is configured to selectively adjust the flow rate of the applicant between about zero cubic meters per hour (0 $m^3$/h) to about three and a half cubic meters per hour (3.5 $m^3$/h).

7. The applicant dispersal assembly as recited in claim 1, further comprising an applicant supply conduit having a first end and a second end, wherein the applicant supply conduit is coupled to the irrigation conduit at the first end, and wherein the applicant supply conduit is coupled to the pump assembly at the second end.

* * * * *